Jan. 30, 1962   F. KLEINEKATHÖFER   3,018,610
METHOD OF MANUFACTURING FILAMENTARY STRUCTURES
Filed April 28, 1959   4 Sheets-Sheet 1

INVENTOR.
FELIX KLEINEKATHÖFER
BY Armand E. Western
ATTORNEY

Jan. 30, 1962   F. KLEINEKATHÖFER   3,018,610
METHOD OF MANUFACTURING FILAMENTARY STRUCTURES
Filed April 28, 1959   4 Sheets-Sheet 2
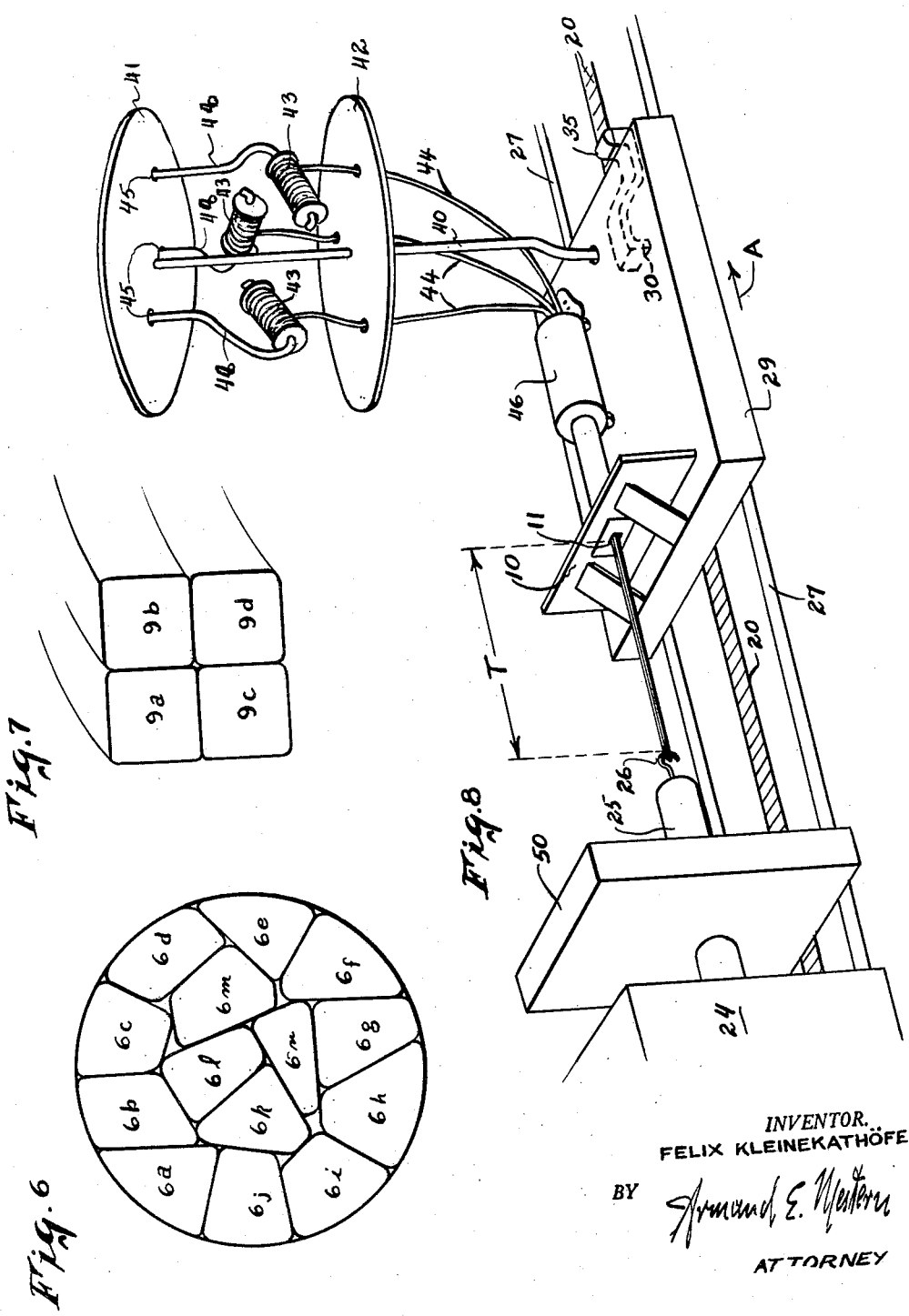
INVENTOR.
FELIX KLEINEKATHÖFER
BY
ATTORNEY

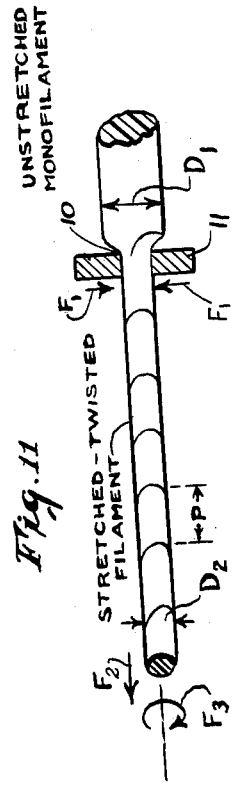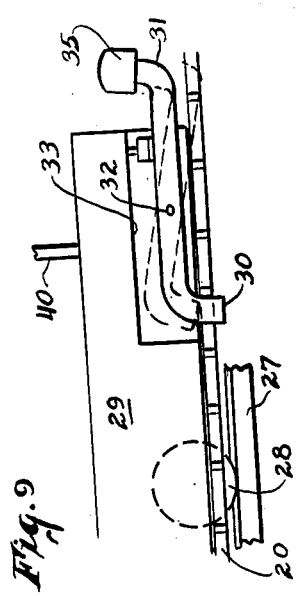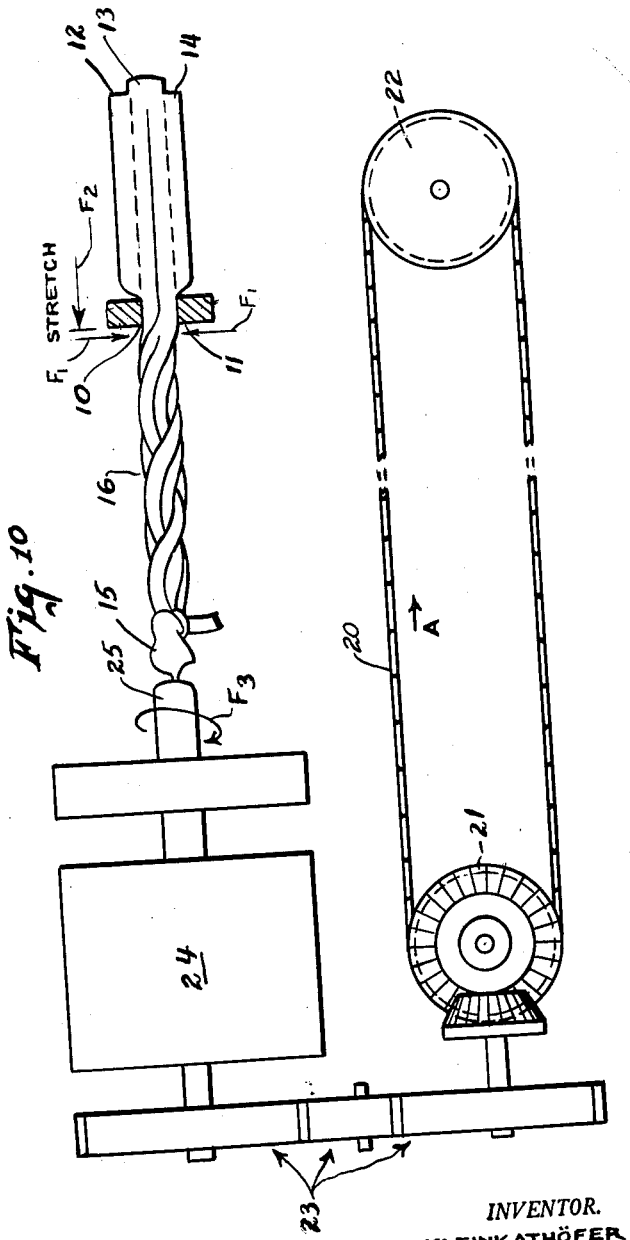

Jan. 30, 1962 F. KLEINEKATHÖFER 3,018,610
METHOD OF MANUFACTURING FILAMENTARY STRUCTURES
Filed April 28, 1959 4 Sheets-Sheet 4

INVENTOR.
FELIX KLEINEKATHÖFER
BY
ATTORNEY

United States Patent Office 3,018,610
Patented Jan. 30, 1962

3,018,610
METHOD OF MANUFACTURING FILAMENTARY STRUCTURES
Felix Kleinekathöfer, Endorf, Upper Bavaria, Germany
Filed Apr. 28, 1959, Ser. No. 809,392
Claims priority, application Germany Apr. 29, 1958
6 Claims. (Cl. 57—157)

This invention relates to a novel filamentary structure for use as cord-like plastic articles of manufacture, and to a method for manufacturing the same.

Cord-like articles in the meaning used in this specification comprise threads, cords, strings, ropes and the like articles, the diameter of which can vary over a very wide range from a fraction of one millimeter to several centimeters.

It is an object of my invention to provide a novel filamentary structure from plastic material which is of higher elasticity and more flexible than known similar structures, while retaining the same mechanical strength as the latter.

It is another object of my invention to provide a novel cord-like article of manufacture from plastic material which has the same or better properties than natural strings or cords made from catgut, and have a better aspect than the natural catgut.

It is a further object of my invention to provide a method for manufacturing filamentary structures of plastic material being of accurately determined profile, and having the same or improved properties compared with the natural strongs or cords made from catgut, in a simple and economic manner.

It is yet another object of my invention to provide a method for manufacturing a filamentary structure from several stretchable plastic filaments in which the filaments do not tend to fly or spread apart from each other and, consequently, do not tend to split the structure into several strands.

It is well known in the plastic art that the threads of certain plastic materials can be deformed by linear stretching with the aid of tensile forces, after they have been produced by a conventional spinning method; these threads attain their ultimate tensile strength only after the stretching and a subsequent heat-setting treatment. Stretching is always accompanied by a reduction of the thread diameter, and the permanent deformation of a thread of stretchable plastic material may consist in an elongation of $$L_2 : L_1 = 4 : 1$$

$L_1$ being the length of the unstretched raw thread as obtained from the spinning treatment, and $L_2$ the permanent length of the thread after stretching, when under no further tensile stresses; and, simultaneously in a reduction of the thread diameter of $$D_2 : D_1 = 1 : 2$$

$D_1$ being the diameter of the unstretched raw thread, and $D_2$ the permanent diameter of the thread after stretching, when no tensile stresses are applied to the thread.

However, stretched threads or cords obtained by the aforesaid exercise of tensile stresses on the raw thread, show relatively little elasticity, they have lost a large part of their ductility and show reduced flexibility and pliancy, compared with the unstretched, unset filaments from which they have been produced; hence the field of their applicability is limited. In particular, they form a poor replacement for catgut, where the latter is used as instrument cords, strings on tennis rackets and all similar uses requiring a good promptly reversible extensibility, i.e. elasticity, pliancy and flexibility.

It has, therefore, been proposed to twist several stretched plastic threads together, in order to impart the above-listed missing properties to cord-like articles made of these plastic materials. However, it was soon found that it is impossible to obtain in this manner cord-like articles, which are permanently true to form, i.e. of a well determined profile. For, due to their above-mentioned lack of elasticity, the threads in the multi-thread cord tend to untwist, as soon as the twisting force is released, the threads tend to spread apart and the cord opens up into its individual strands.

One known method of overcoming this notorious drawback has been to plait at least three plastic threads together, but such a method is naturally uneconomical and extremely time-consuming.

In contrast to the known cord-like articles, the filamentary structure according to my invention consists of preferably at least two or more plastic filaments which are of such cross sectional polygonal shape that the cross section of the multifilament cord is substantially entirely filled by the mass of the strands while the several cross sectional areas form a mosaic-type composite cross sectional area of well defined profile of, for instance, circular, square, triangular and higher polygonal shape.

These filamentary structures of manufacture are produced by the method according to my invention which comprises the steps of simultaneously twisting and linearly stretching one or several previously unstretched, unset plastic monofilaments as they are obtained by the conventional spinning methods and simultaneously preferably compressingly deforming the monofilaments to a desired profile of narrower total cross sectional area than the total cross sectional area of the circumference about the unstretched filaments placed close together.

Preferably the stretch-twisting treatment is carried out by twisting two or more monofilaments together under simultaneous stretching and drawing of the combined monofilaments jointly through matrix means of lesser cross sectional area than that defined by the circumference about the combined unstretched filaments.

The elasticity and superior torsional properties of the resulting cord-like articles can be influenced by ranging the helical pitch of the twist given the filaments as well as by a suitable choice of the twisting and stretching forces exerted on the filament or filaments during the drawing of the latter through the matrix means such as a gauge plate or the like.

The filamentary structure according to the invention can be produced from any stretchable plastic material which is known to set and thereby assume its ultimate tensile strength, extensibility and pliancy only after being subjected to the above-mentioned tensile stresses leading to a very considerable linear elongation and corresponding reduction of the diameter of the spun filament, and subsequent heat-setting, i.e. the starting material should be crystallizable to a pronounced degree by the aforesaid linear stretching.

Such plastic filaments can be made of a great variety of plastic materials such as, for example, poly-amides, polyvinyl-chloride, polyacrylic and polyester materials.

I prefer to use polyamide filaments such as nylon and Perlon; among the polyvinyl-chloride filaments there are Rhovyl and PeCe fiber, among polyacryl filaments are Orlon, Imelon, Dralon, Redon and Dolan, among the polyester group Dacron, Diolen and Trevira. Some commercial sources for polyamide fibers are given below:

Durethan BK, Farbenfabriken Bayer AG, Leverkusen, Germany
Drilon, Holzverzuckerungs AG, Zurich, Switzerland
Nylon, Allied Chemical & Dye Corp., New York, N. Y.
Nylon, Imperial Chemical Industries Ltd., London, Great Britain
Nylon, Soc. Rhodiacéta, Lyon, France Polyamid AH, VEB Chemische Werke, Schkopau, Germany
Rilsan, Organico S.A. Paris, France
Trogamid, Dynamit-Actien-Gesellschaft, Troisdorf, Germany
Ultramid A, B, BM, S, BASF, Ludwigshafen, Germany
Zystel, E. I. du Pont de Nemours, Wilmington, Del.

The polyamides exceed the other above-listed materials with respect to stretchability.

However, it will be understood that the number of filament-forming plastic materials in expanding so rapidly and new materials appear continuously on the market, that it is impossible to give a comprehensive list of all materials suitable for practising my invention.

Therefore, all filament-forming plastic materials which can be heat set upon stretching after spinning or extrusion to adopt their permanent physico-mechanical properties such as in particular tensile strength and pliancy, shall be considered as equivalently suitable materials for the purposes of my invention.

It should be understood that my invention does not include artificial fibers that are produced by spinning without or with twisting in a precipitation bath.

The nature of my invention and the advantages inherent therein, will be understood still better from the further description thereof in connection with the accompanying drawings in which:

FIGURE 6 shows in cross section a filamentary structure of circular profile according to the invention produced from fourteen previously unstretched monofilaments of stretch-setting plastic material;

FIGURE 7 shows in cross section a filamentary structure of square profile according to the invention produced from four previously unstretched monofilaments of stretch-setting plastic material;

FIGURE 8 illustrates in perspective an apparatus for carrying out the method of producing filamentary structures according to the invention from unstretched monofilaments of stretch-setting material;

FIGURE 9 shows a detail of the apparatus illustrated in FIGURE 8;

FIGURE 10 shows further details of the apparatus shown in FIGURE 8 and also illustrates how the method according to the invention is carried out for producing plastic multi-filament cords with the apparatus;

FIGURE 11 illustrates on the same apparatus as shown in FIGURES 8 to 10, how to carry out the method according to the invention in order to manufacture plastic monofilament threads or cords according to the invention;

Figure 1:
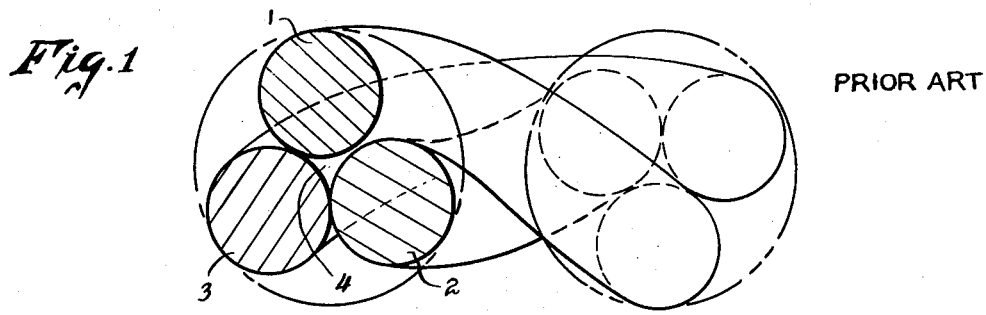
FIGURE 1 is perspective and partly a cross-sectional view of a cord consisting of three prestretched and set plastic filaments manufactured according to a known method.
Figure 2:
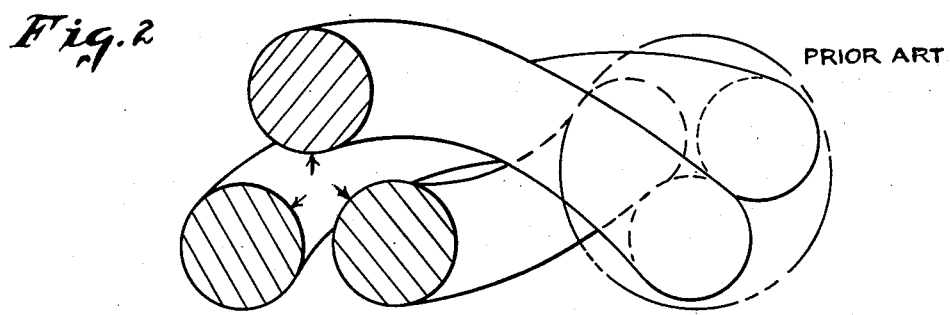
FIGURE 2 shows the same cord as in FIGURE 1, after torsional stress on the same has been relieved.
Figure 3:
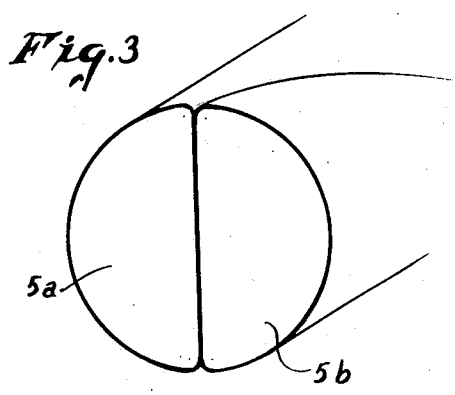
FIGURE 3 shows in cross section a filamentary structure according to the invention produced from two unstretched plastic filaments and having a circular profile.

Referring now to the drawings more in detail, FIGURES 1 and 2 show a cord produced according to a known method from three previously stretched and set plastic threads 1, 2, and 3; in FIGURE 1 the cord is shown while under torsional stress, while FIGURE 2 illustrates the tendency of the three threads to untwist and fly apart when torsional stress on the cord is relieved. It will be noted that the individual threads have not been deformed by the twisting step but retain individually their circular profiles. The dash-dotted lines indicate the envolving circumference of the cord and it is seen that the cross sectional area described thereby is only very poorly filled out by the three threads. The cord or rope is thus not true to form. Considerable hollow interspaces 4 remain between the threads.

Various embodiments of the filamentary structure according to the invention are illustrated in FIGURES 3 to 7 and 12. The embodiments shown in FIGURES 3 to 6 show multifilament threads or cords of generally circular cross sectional area, while the embodiment shown in FIGURE 7 shows a thread or cord of square cross sectional area. Of course, any desired polygonal profile could be given to the filamentary structures according to the invention. It will be noted that, in FIGURE 3, the filamentary structure consists of two filaments 5a and 5b each deformed from an originally circularly profiled unstretched, unset filament to adopt a half-circular cross section. The circular circumference of the multifilament structure is practically filled out by the filament cross sections. These cords or threads retain their compact structure also after the torsional stresses applied during their manufacture have been relieved. The cord or thread is free from any hollow interspaces between the filaments.

Figure 4:
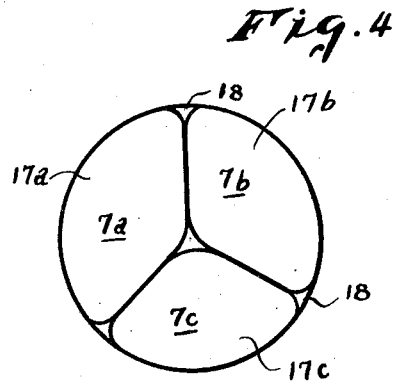
FIGURE 4 shows in cross section a filamentary structure of circular profile according to the invention produced from three previously unstretched plastic filaments.
Figure 5:
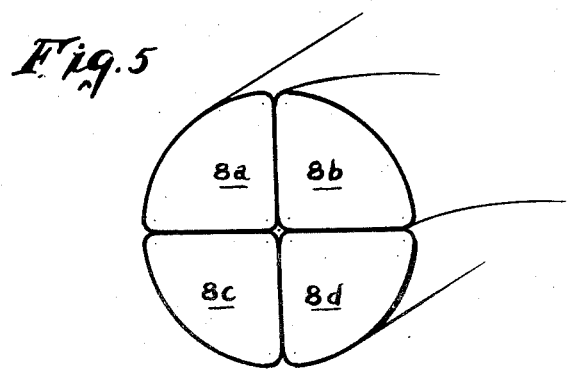
FIGURE 5 shows in cross section a filamentary structure of circular profile according to the invention produced from four previously unstretched and consequently unset monofilaments of stretch-setting plastic material.

The same applies to the embodiments shown in FIGURE 4, which shows a filamentary structure made up of three filaments 7a to 7c, FIGURE 5 showing a filamentary structure made up of four filaments 8a to 8d and FIGURE 6, which shows a multifilament thread or cord made up of fourteen filaments 6a to 6n.

The embodiment shown in FIGURE 7 differs from the previously described embodiment only in that it shows a square profile of the total filamentary structure. It is constituted by four filaments 9a to 9d, which fill out the square cross sectional area of the total structure practically completely.

The method of producing filamentary structures according to the invention, will now be explained in connectoin with FIGURES 8 to 11.

As shown in FIGURE 11, a monofilament can be treated by inserting the end of an unstretched, unset filament as directly obtained by spinning or extrusion from a stretchable thermosetting or stretch-setting plastic material into a profiling or gauging plate 10 having a window 11 of circular or polygonal shape, the window area being smaller than the cross sectional area of the unstretched filament.

The filament is previously adapted for passage through the window by sharpening or by stretching a short length thereof to reduce its diameter from the initial diameter $D_1$ to a diameter not exceeding $D_2$, i.e. the width of the window 11.

The free thinned end of the filament is then attached, for instance tied, to holding means which will be described further below, and is simultaneously drawn out of window 11 and twisted, so that three different kinds of forces $F_1$, $F_2$, and $F_3$ contribute simultaneously to the deformation of the filament. Of the forces, $F_1$ can be described as a compressing force in that it reduces the size of cross sectional area of the filament from one corresponding to $D_1$ to a size corresponding to $D_2$; force $F_2$ linearly elongates the filament, and force $F_3$ is a torsional force applying twist to the thread at a given helical pitch P.

It is an important advantage of the method of the invention that the rearrangement of plastic molecules in the filament under the effect of forces $F_1$, $F_2$ and $F_3$ leads to the generation of internal heat sufficient to raise the temperature in the filament to 50 to 90° C. so that the filament is simultaneously thermoset. A subsequent conventional heating step for finally setting the twist-stretched filament is therefore superfluous and can be dispensed with; neither would such step adversely affect the properties of the final product if applied thereto.

FIGURE 10 illustrates the same method applied to three starting filaments 12, 13, and 14 inserted in the die consisting of window 11 and gauging plate 10, and fastened with their sharpened or thinned ends to a fastening hook 15, for instance by tying a knot around the hook.

The group of three filaments is then stretched as indicated by vector $F_2$ and simultaneously twisted as indicated by arrow $F_3$, while applying profiling forces $F_1$.

The resulting filamentary structure 16 has a cross sectional aspect as shown in FIGURE 4. In contrast to a known plaited structure, the filaments 12, 13, and 14 do not retain their original profile as received by the spinning or extrusion step but are deformed to attain the profile of filaments 7a to 7c in FIGURE 4, thus becoming adapted to lie side by side with each other with practically no, or very minor interspaces left between the filaments, while their outer surfaces 17a, 17b and 17c almost perfectly fill the circular profile 18 of the total thread or cord structure.

When using a gauge plate having a polygonal window it is recommended, in order to obtain a multifilament structure of well-defined profile, to combine in the structure as many filaments as the polygon has corners, i.e. three filaments in a trigonal, four filaments in a square, six filaments in a hexagonal-window gauge etc.

At the end of the twist-stretching drawing of the thread or cord through the gauge window, the tension on the filamentary structure between window 11 and fastening means 15 is released and the finished product then shows a slight contraction of a few percent of its linear extension and thus is permanently set, without requiring any subsequent extraneous heating to become thermoset.

More details of carrying out the method according to the invention in practice, will become apparent from the description given hereinafter of an apparatus which is well suited for carrying out this method, as illustrated in FIGURES 8 to 10 of the drawings. It should, however, be understood that this method can be carried out with many conventional apparatus and is not limited to employment of the particular apparatus to be described below.

This apparatus comprises in a suitable machine frame (not shown for the sake of clarity) an endless chain 20, which can be driven about sprocket-wheels 21 and 22 or similar means, by means of a shiftable gear train 23 or similar variable hydraulic, mechanical or electrical transmission means in the direction indicated by arrow A, from the shaft 25 of a motor 24. To the same shaft 25, there are connected, for preferably direct rotation therewith, hook-shaped fastening means 26, to which the free end of the filament or filaments to be treated can be attached.

On parallel rails 27 of the machine frame, there is movably mounted on wheels 28 a carrier table 29, which carrier table is releasably engaged in one of the links of chain 20 by means of the nose 30 of a lever 31 pivoted about a pin 32 in a recess 33 of table 29. A spring urges nose 30 into engagement with chain 20 so that the table 29 is transported in the direction of arrow A (FIGURE 8) as the motor 24 drives chain 20.

Table 29 can be disengaged from chain 20 by depressing knob 35 of lever 31 so that the latter adopts the position indicated by dashed lines in FIGURE 9, whereby nose 30 is lifted out of the respective link of chain 20.

Table 20 bears on its top surface a pole 40 bearing a top disc 41 and a guide disc 42 at a lower level. From top disc 41, there are suspended one or several filament-bearing spools 43 from which the untreated filament or filaments can be unruled freely without any stretching being exercised on the same. In order to avoid any torsional effects on the filaments, spools 43 are held freely rotatably on bent supporting arms 44, which are in turn secured freely rotatably in top disc 41 at 45. From spools 43, the filaments 44 are guided through openings in guide disc 42 downwardly into a box 46 in which the filaments are exposed to moisture.

In particular polyamide threads will support much higher tensile stress and maximum loads without rupture in a moisture laden atmosphere, than they do when dry. In the simplest device, box 46 will contain a water-filled sponge, but may also contain any other more accurate known device for controlling the humidity of the filaments.

The filaments 44 then pass through window 11 of gauge plate 10, and are twist-stretched in the zone T between the latter plate and hook-shaped fastening means 26.

Motor 24 rotates the shaft 25 and means 26 thereby applying torsional forces to the filaments in zone T, while simultaneously it moves table 29 via gear train 23 and sprocket-wheel 21 in the direction of arrow A, thereby linearly stretching the filaments which are pulled out of window 11, in which they are simultaneously calibrated under application of profiling forces $F_1$.

The twist applied to the filaments by the rotation of fastening means 15 (or 26) ends in window 11 of gauge plate 10, and is not transmitted through the window to the portion of the filaments drawn from spools 43 and passing through box 46.

When table 29 has reached its end position on the upper reach of chain 20, i.e. shortly prior to where the latter contacts sprocket-wheel 22, lever knob 35 is depressed, and the contracting finished cord will return table 29 by a short length of way toward the left in FIGURE 10. This return movement can be braked by hand or by a suitable known braking means gradually releasing or by a suitable known braking means gradually releasing table 29 completely so that there remains no contracting forces in the finished product, which will thus be completely set.

It will be easily understood that instead of maintaining support 50 of the twist-imparting fastening means stationary, it would be equally possible to devise a machine in which table 29 would remain stationary, and support 50 would move. However, for obvious constructional reasons, the embodiment shown in FIGURES 8 to 10 is preferred.

Figure 13:
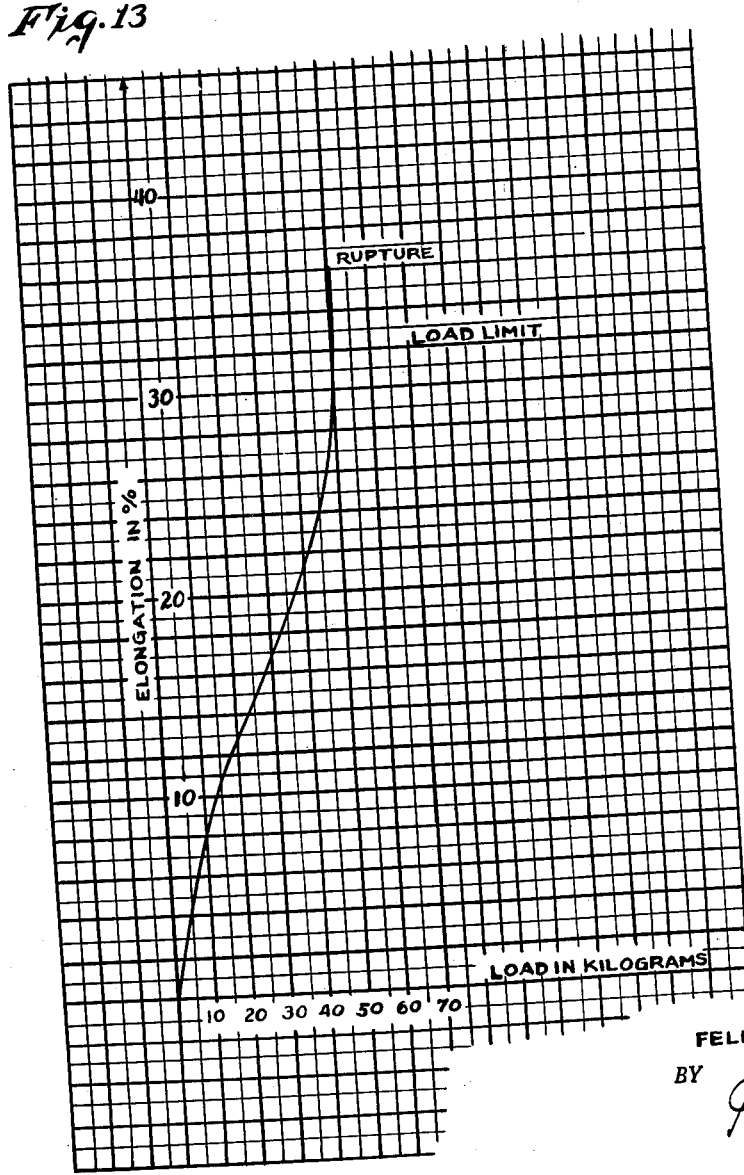
FIGURE 13 is a graph showing the load-elongation diagram of a triple-filament cord according to the invention.

The diagram of FIGURE 13 illustrates the load-elongation curve of a thread according to the invention produced from three filaments of previously unstretched, unset polyamide (nylon) material and having a circular profile, a diameter of 1.4 millimeters, and a helical pitch of 6 millimeters.

In an atmosphere having from 60 to 100% of moisture, this thread will support at room temperature a load of 50 kilograms permitting a maximal substantially reversible elongation of about 30 to 32%, without rupture. The elongation is permanent in the range of about 32 to 36% under a load higher than 50 kilograms and rupture occurs at the latter limit of elongation.

This compares with an elongation of conventional wet nylon thread at rupture in the order of 25 to 27%.

The elasticity and to a minor degree the extensibility of the finished cords and threads according to the invention depends among other factors on the degree of twisting applied during their manufacture. A higher degree of twisting, i.e. a shorter pitch, will make the filamentary structure somewhat less extensible, and so will too little twisting which will also fail to satisfactorily merge the filaments together and to generate sufficient internal heat for complete setting of the finished product.

While it is impossible to give general limit data for the degree of twisting and stretching to be applied, in view of the great number of plastic materials to which the method according to my invention may be applied, short trial runs will permit to empirically determine the best conditions for each material.

In the case of polyamide materials such as nylon and Perlon, I have found that optimal results are obtained with a pitch of 6 millimeters for a diameter of the finished product of 1.4 millimeter. Such threads or cords can be produced, from unstretched, unset nylon or Perlon filaments having a diameter of 0.8 to 1 millimeter, with the above described apparatus, in which the hook-shaped fastening means 15 (or 26) are rotated at a speed of 2800 revolutions per minute, while the table 29 is advanced at a linear velocity of 20 centimeters per second. It will be understood that these data are given by way of example only and are not to be considered as limitative of the scope of the invention in any way or form.

Instead of the gauge plate 10, any other known profiling means may also be employed. It is also possible to twist-stretch the fibers directly without using a gauge plate. In this instance, the finished product possesses many of the advantageous properties described hereinbefore. In particular its filaments are free from a tendency to fly apart, and the product is more pliable. However, the accurate profiling of the filamentary structure and the internal peculiar deformation of the individual filaments to fill in all interspaces cannot be attained to the same degree.

The method according to the invention permits to my knowledge for the first time to produce threads, cords and ropes of any desired thickness in a very simple and most economical manner from stretchable, but previously unstretched, unset filaments of certain plastic materials.

The final products of a filamentary structure according to the invention have a very attractive aspect, in particular if filaments of different colors are twist-stretched together, and are much more pliant and flexible than the known products, due to a much higher elasticity of the products as compared with that of the known products. The tensile strength of the product at rupture is approximately that of the combined tensile strengths of the filaments making up the same.

Figure 12:
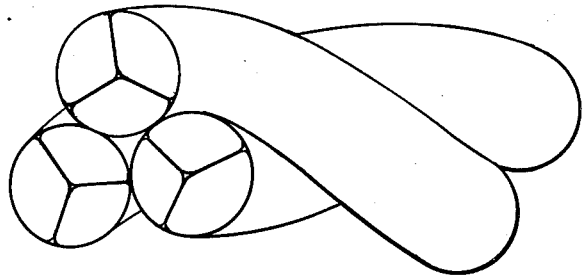
FIGURE 12 illustrates a rope manufactured from three cords according to the invention.

The finished articles of manufacture can be used as threads, as cords for musical instruments or in a tennis racket instead of catgut, and for many other purposes. The superior elasticity of these cords become apparent when comparing the effect of hitting a ball with a tennis racket built with the cords according to the invention with the well-known hard wood-like effect of a tennis racket fitted with conventional nylon cords. Several of the cords produced according to the invention can be twisted together in a rope as illustrated in FIGURE 12.

It will be understood that this invention is susceptible to modification in order to adapt it to different usages and conditions, and, accordingly, it is desired to comprehend such modifications within this invention as may fall within the scope of the appended claims.

What I claim is:

1. A method for manufacturing filamentary structures comprising the steps of drawing a filamentary material comprising at least two unstretched, unset filaments consisting of stretchable and thereby crystallizable plastic substance through a die wherein a profile smaller than the total cross sectional area of the filamentary material is enforced on the latter, twisting and simultaneously stretching the filamentary material in a zone subsequent to said die so as to deform the filaments in said filamentary material to substantially fill the profile enforced upon said material, and to generate sufficient heat in said filamentary material to set the latter.

2. The method of claim 1, wherein the plastic material is a nylon.

3. A method for manufacturing filamentary structures comprising the steps of moisturizing a filamentary material comprising at least two unset filaments consisting of stretchable and thereby crystallizable plastic substance, drawing said filamentary material through a die wherein a profile smaller than the total cross sectional area of the filamentary material is enforced on the latter, twisting and simultaneously stretching the filamentary material in a zone subsequent to said die so as to deform the filaments in said filamentary material to substantially fill the profile enforced upon said material, and to generate sufficient heat in said filamentary material to set the latter.

4. The method of claim 3, wherein the plastic material is a nylon.

5. A method for manufacturing filamentary structures comprising the steps of moisturizing a filamentary material comprising at least two unset filaments consisting of stretchable and thereby crystallizable plastic substance, drawing said filamentary material through a die wherein a profile smaller than the total cross sectional area of the filamentary material is enforced on the latter, permitting the filaments in said filamentary material prior to its entry into said die to rotate freely about its longitudinal axis so as to eliminate twist in said filament, twisting and simultaneously stretching the filamentary material in a zone subsequent to said die so as to deform the filaments in said filamentary material to substantially fill the profile enforced upon said material, and to generate sufficient heat in said filamentary material to set the latter.

6. The method of claim 5, wherein the plastic material is a nylon.

References Cited in the file of this patent

UNITED STATES PATENTS

| | | |
|---|---|---|
| 2,352,861 | Pierce | July 4, 1944 |
| 2,545,869 | Bailey | Mar. 20, 1951 |

FOREIGN PATENTS

| | | |
|---|---|---|
| 794,412 | Great Britain | May 7, 1958 |